(12) United States Patent
Wang et al.

(10) Patent No.: US 9,489,190 B1
(45) Date of Patent: Nov. 8, 2016

(54) MESSAGE PROCESSING ENGINE

(71) Applicant: AMAZON TECHNOLOGIES, INC., Reno, NV (US)

(72) Inventors: Fei Wang, San Jose, CA (US); Maxim Spivak, San Jose, CA (US); Robert Franklin Ebert, Mountain View, CA (US); Tapas Kanti Roy, Cupertino, CA (US); Arindam Bhattacharya, Fremont, CA (US)

(73) Assignee: Amazon Technologies, Inc., Reno, NV (US)

( * ) Notice: Subject to any disclaimer, the term of this patent is extended or adjusted under 35 U.S.C. 154(b) by 173 days.

(21) Appl. No.: 14/030,078

(22) Filed: Sep. 18, 2013

(51) Int. Cl.
*G06F 9/44* (2006.01)
*G06F 9/445* (2006.01)

(52) U.S. Cl.
CPC .................................. *G06F 8/65* (2013.01)

(58) Field of Classification Search
None
See application file for complete search history.

(56) References Cited

U.S. PATENT DOCUMENTS

| | | | | |
|---|---|---|---|---|
| 6,289,510 B1* | 9/2001 | Nakajima | ............... | 717/170 |
| 6,345,387 B1* | 2/2002 | Morrison | ............... | 717/170 |
| 6,393,605 B1* | 5/2002 | Loomans | ............... | 717/121 |
| 7,178,056 B2* | 2/2007 | Shanbhogue | ............... | 714/6.3 |
| 7,657,886 B1* | 2/2010 | Chen | ............... | G06F 8/65 |
| | | | | 711/202 |
| 8,234,638 B2* | 7/2012 | Bird | ............... | G06F 21/54 |
| | | | | 717/127 |
| 8,438,315 B1* | 5/2013 | Tao et al. | ............... | 710/8 |
| 8,555,273 B1* | 10/2013 | Chia | ............... | G06F 8/665 |
| | | | | 717/168 |
| 8,635,608 B2* | 1/2014 | Ramesh | ............... | G06F 8/65 |
| | | | | 717/168 |
| 8,881,137 B2* | 11/2014 | Bird | ............... | G06F 21/54 |
| | | | | 717/127 |
| 8,935,670 B2* | 1/2015 | Kemmler | ............... | G06F 8/65 |
| | | | | 709/203 |
| 9,037,887 B2* | 5/2015 | Gupta | ............... | G06F 1/32 |
| | | | | 455/574 |
| 2004/0103412 A1* | 5/2004 | Rao | ............... | G06F 11/1433 |
| | | | | 717/171 |
| 2004/0107417 A1* | 6/2004 | Chia | ............... | G06F 8/65 |
| | | | | 717/171 |
| 2004/0168165 A1* | 8/2004 | Kokkinen | ............... | G06F 8/68 |
| | | | | 717/168 |
| 2004/0243991 A1* | 12/2004 | Gustafson | ............... | G06F 8/65 |
| | | | | 717/168 |
| 2004/0243993 A1* | 12/2004 | Okonnen | ............... | G06F 8/65 |
| | | | | 717/168 |

(Continued)

*Primary Examiner* — Tuan Q. Dam
*Assistant Examiner* — Zheng Wei
(74) *Attorney, Agent, or Firm* — Lindauer Law, PLLC (57) ABSTRACT

Techniques are described for updating applications installed on devices. The applications may include native applications having a web view component to handle interpreted language instructions. The applications may also include web applications executable within a browser. A message may be sent to a computing device, the message including update information specifying one or more updates to the state or the features of an application. The update information may be described using interpreted language instructions. To handle the updates to an application in instances when the application is inactive, a stand-alone interpreter engine may be employed instead of the web view component or instead of the interpreter engine included in a browser. Use of the stand-alone interpreter engine may mitigate possible performance effects or intrusive user interface elements from launching the web view component or the browser-based interpreter engine to perform update operations.

18 Claims, 9 Drawing Sheets

(56) References Cited

U.S. PATENT DOCUMENTS

| | | | |
|---|---|---|---|
| 2005/0268296 A1* | 12/2005 | Marolia | G06F 8/65 717/168 |
| 2006/0048130 A1* | 3/2006 | Napier | G06F 8/65 717/168 |
| 2006/0059478 A1* | 3/2006 | Krajewski et al. | 717/168 |
| 2006/0130040 A1* | 6/2006 | Subramanian | G06F 8/65 717/168 |
| 2006/0190939 A1* | 8/2006 | Chen | G06F 8/65 717/168 |
| 2007/0106981 A1* | 5/2007 | Bird | G06F 21/54 717/127 |
| 2007/0192763 A1* | 8/2007 | Helvick | 717/168 |
| 2009/0064123 A1* | 3/2009 | Ramesh | G06F 8/65 717/168 |
| 2010/0157989 A1* | 6/2010 | Krzyzanowski | G06F 9/4445 370/352 |
| 2011/0126185 A1* | 5/2011 | Waris et al. | 717/169 |
| 2011/0321024 A1* | 12/2011 | Knothe et al. | 717/168 |
| 2012/0209947 A1* | 8/2012 | Glaser et al. | 709/217 |
| 2012/0246629 A1* | 9/2012 | Bartel et al. | 717/168 |
| 2013/0104114 A1* | 4/2013 | Reiss et al. | 717/170 |
| 2013/0111461 A1* | 5/2013 | Zubas et al. | 717/173 |
| 2014/0280460 A1* | 9/2014 | Nemer et al. | 709/202 |

* cited by examiner

MESSAGE PROCESSING ENGINE

BACKGROUND

Given the popularity of small, mobile computing devices such as smartphones, tablets, and the like, application developers create a wide variety of applications to execute on such devices. Application developers may periodically update the applications installed on mobile devices to add new features, correct problems, improve user experience, and so forth. Because some mobile devices may have limited capabilities, such as limited storage capacity or limited processing power, updating applications may consume a substantial proportion of the resources of a mobile device and may result in a degraded user experience.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for updating applications on computing devices, through the use of a stand-alone interpreter engine module configured to interpret code that is written in an interpreted programming language. In some cases, one or more applications installed on a computing device may include one or more native applications that are compiled to execute on a particular target platform such as a computing device that runs a particular operating system or that includes a particular processor. The application(s) on a computing device may also include one or more web applications that are written to execute within a web browser on the computing device.

In some cases, the application(s) on a computing device may include one or more native applications that are written to include one or more objects, classes, or other components that enable the native application to interpret information that may otherwise be interpreted through a web browser. In some cases, a native application may include a web view component that enables the application to interpret, execute, or otherwise handle code written in JavaScript™, Hypertext Markup Language (HTML), or another language that may otherwise be handled by a web browser or a dedicated runtime interpreter engine (e.g., a JavaScript™ runtime). For example, in cases where a native application is written to execute on a version of the Android™ operating system from Google™, Inc. of Mountain View, Calif., USA, the native application may include a web view component such as the WebView class included in the android.webkit package. As another example, in cases where a native application is written to execute on a version of the iOS™ operating system from Apple™, Inc. of Cupertino, Calif., USA, the native application may include a web view component such as the UIWebView class. A WebView class or a UIWebView class may be included in the source code of the native application, and embedded in the native application as a component when the source code is compiled to generate a machine executable version of the native application. Alternatively, a web view component may be included in a runtime library that is accessed by the native application when the native application executes. When the native application executes, an object instance of the WebView or UIWebView class may perform operations to interpret, execute, or otherwise handle code written in JavaScript™, Hypertext Markup Language (HTML), or other languages. Compiling or otherwise including a web view component in a native application may enable the native application to execute JavaScript™ or other interpreted language code outside of a web browser environment. Accordingly, a web view component may be described as an interpreter engine that is configured to execute with the native application and that is configured to interpret, execute, or otherwise handle code written in an interpreted programming language.

An interpreter engine or interpreter engine module may include any process, application, or module that executes, interprets, or otherwise handles code or instructions written in an interpreted programming language. Accordingly, an interpreter engine may include a runtime engine, a virtual machine, an interpreter application or process. Further, an interpreter engine may include a library, component, method, subroutine, or sub-process, of one or more applications, processes, or modules.

To update an application on a computing device, one or more messages including update information may be sent to the computing device from another device (e.g., an update server device or a messaging server device). The update information included in the message(s) may be information to update one or more features of an application. Such feature update information may provide an updated version of the application, including updates to the features, functions, design, user interface, code, or other aspects of the application. For example, feature update information may include updates to the source code or to the binary executable of the application. Such updates may implement new functions or features, or modify functions or features that were supported in a previous version of the application. Update information may also include information to update a state of an application. Such state update information may include updates to a current or recent runtime state of the application, such as updates to data stored in one or more objects, variables, or other data structures of the application.

Implementations support the use of any protocol, format, schema, or standard to implement the one or more messages that carry the update information. In some implementations, the message(s) may be arranged according to the JavaScript Object Notation (JSON) standard originally specified by Douglas Crockford and described in Request for Comments (RFC) 4627 of the Network Working Group. In such implementations, the update information may be described in JavaScript™ code. Alternatively, the update information may be described using another interpreted programming language, or any other format. In cases where the update information is sent via JSON message(s) to update a target application, and the target application is not currently active when the message(s) are received, an interpreter engine may be started to parse, interpret, or execute the JavaScript™ encoded update information carried in the JSON message(s). In cases where the target application is a web application, the launched interpreter engine may be a web browser component that interprets, handles, or otherwise processes instructions in an interpreted programming language when the web application is executing within the web browser. In cases where the target application is a native application that includes a web view component to handle JavaScript™ code, the launched interpreter engine may be an instance of the web view component. The launched interpreter engine may also be a stand-alone interpreter engine (e.g., a full featured or large memory footprint engine) that executes independently of a web browser.

In scenarios where update information is received for an application that is not currently active on the device, launching a more full featured interpreter engine (e.g., an engine that is a component of a web browser, or a web view component instance) to process the update information may lead to memory usage or processor usage that may degrade the performance of the computing device or of other processes executing on the computing device. Moreover, in some cases launching a web browser or a web view component instance on the computing device may spawn one or more user interface (UI) elements that are displayed on the computing device. Such UI elements may be intrusive in that they may interfere with other applications that are currently foregrounded, active, and in use by a user of the device. These or other potentially performance degrading or intrusive effects may be particularly pronounced on smaller devices (e.g., mobile devices) with limited storage, memory, processing, or display capabilities.

To mitigate such possible effects, implementations include a stand-alone interpreter engine that may be executed on receipt of the message(s) carrying the update information. The stand-alone interpreter engine may have fewer features or reduced functionality compared to that of the more full featured engine (e.g., a web view component or an engine that is a component of a web browser) that may otherwise be executed to handle the update information. For example, the stand-alone engine may lack UI features or other displayed features that may be present in the more full featured engine. In some cases, the stand-alone interpreter engine may have a smaller memory footprint than that of the more full featured engine, such that the stand-alone interpreter engine may execute in a smaller portion of active memory on the device. The stand-alone interpreter engine may also consume less processing capacity on the device. In some cases, because the stand-alone interpreter engine may include fewer features or reduced functionality compared to the more full featured engine, the stand-alone interpreter engine may start up in less time than the more full featured engine. By employing the stand-alone interpreter engine to process the received update information, one or more inactive applications may be updated while avoiding the intrusive UI elements or performance degradation that may be incurred by launching the more full featured engine on the computing device.

Figure 1:
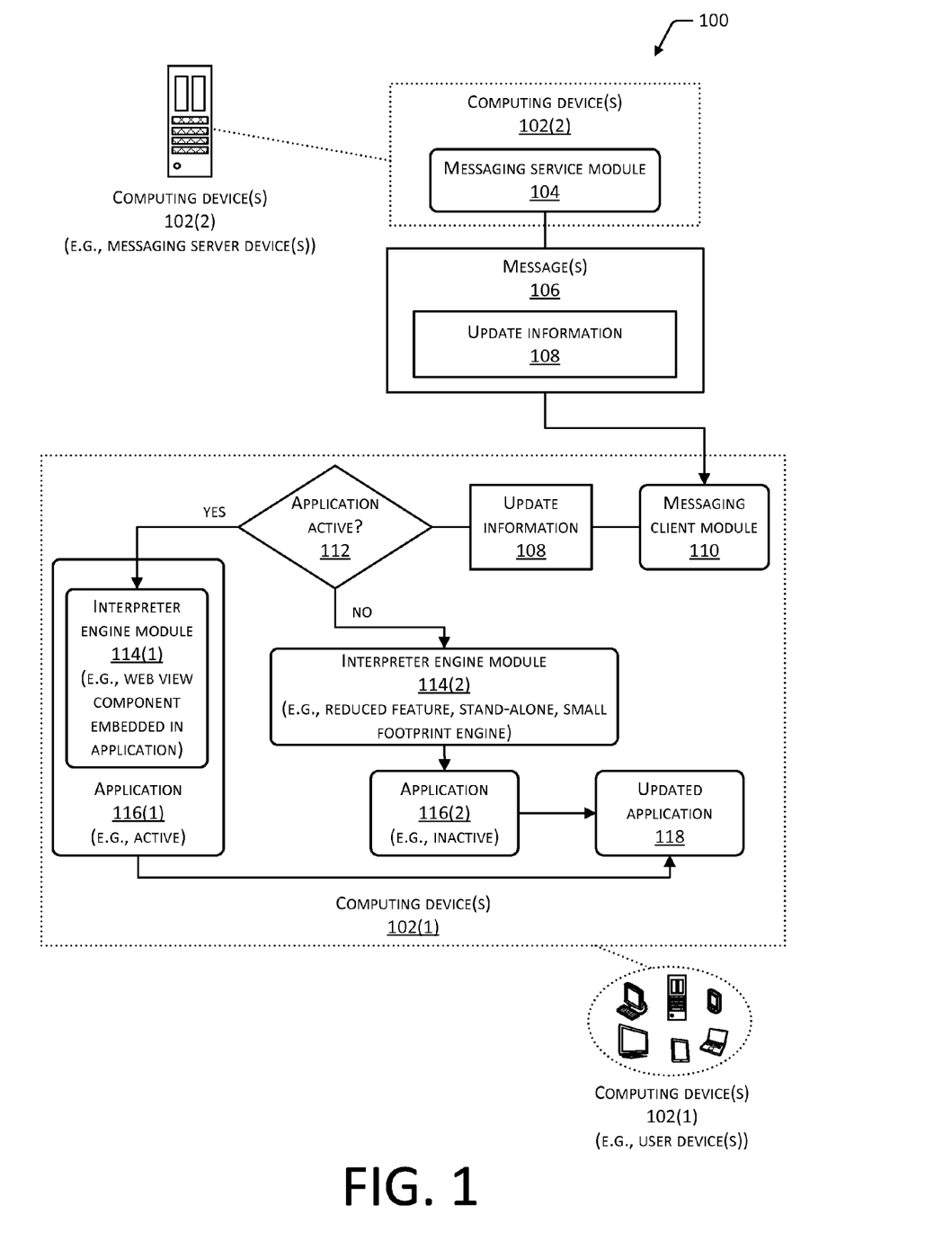
FIG. 1 depicts an environment for updating an application on a computing device that employs a stand-alone interpreter engine module for performing update operations, in cases where the updated application is a native application that includes a web view component.

FIG. 1 depicts an environment 100 for updating an application on a computing device that employs a stand-alone interpreter engine module for performing update operations. FIG. 1 illustrates implementations where the updated application is a native application that includes a web view component as described above.

The environment 100 may include various computing devices 102. The computing devices 102 may comprise any type of computing device, including but not limited to a server computer, a personal computer, a network computer, a cloud computing or distributed computing device, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. An example of the computing devices 102 is described further with reference to FIG. 5. In some cases, two or more of the computing devices 102 may comprise a cluster, cloud, farm, or other grouping of multiple devices that coordinate operations to provide load balancing, failover support, parallel processing capabilities, shared storage capacity, or other aspects. In some cases, the computing device(s) 102 may include a display to visually present information to a user. However, implementations are not so limited, and may also support computing device(s) 102 that do not have a display (e.g., headless devices).

In the example of FIG. 1, the environment 100 includes one or more computing devices 102(1) that may be user devices owned by, operated by, or otherwise associated with one or more users. In some cases, the computing device(s) 102(1) may be mobile devices such as smartphones, tablet computers, and the like, designed to be readily portable by a user. The environment 100 also includes one or more computing devices 102(2) that may be server devices such as messaging server devices or update server devices. The computing device(s) 102(2) may be located remotely from the computing device(s) 102(1), and may communicate with the computing device(s) 102(1) over one or more networks.

The computing device(s) 102(2) may include messaging server device(s) that execute a messaging service module 104 to send one or more messages 106 to the computing device(s) 102(1). Implementations support the use of any protocol, format, schema, or standard to implement the message(s) 106. In some cases, the message(s) 106 may be arranged according to the JSON standard, or according to a version of the JSON standard that has been at least partly modified. The message(s) 106 may include information that is described using an interpreted programming language. For example, the message(s) 106 may include code in the JavaScript™ programming language, originally developed by Network Communications™ and currently provided by Oracle Corporation™ of Redwood City, Calif., USA.

Although the examples herein may describe the use of JavaScript™ code in the message(s) 106 and elsewhere, implementations also support the use of other programming languages. For example, implementations support the use of any interpreted programming languages or scripting languages, including but not limited to one or more of the following: JavaScript™ or Java™, provided by Oracle Corporation™ of Redwood City, Calif., USA; Visual Basic™, VBScript™ or C#™, provided by Microsoft Corporation™ of Redmond, Wash., USA; Perl™, originally developed by Larry Wall; and so forth. Implementations also support the use of interpreted programming languages that are markup languages such as HTML, Dynamic HTML (DHTML), Extensible Markup Language (XML), Extensible HTML (XHTML), and so forth. Because the message(s) 106 may carry information that is coded or otherwise described using an interpreted programming language, the computing device(s) 102(1) that receive the message(s) 106 may execute one or more interpreter engines to interpret, execute, or otherwise handle code included in the message(s) 106.

Implementations support any type of information carried by the message(s) 106. In some implementations, the message(s) 106 may carry update information 108 that describes one or more updates to be applied to one or more applications on the computing device(s) 102(1). The update information 108 and the message(s) 106 are described further with reference to FIG. 4. In some implementations, the update information 108 may describe updates to a state of one or more applications, to feature(s) of one or more applications, or to both the state and feature(s) of one or more applications. Such update information 108 may be sent from the computing device(s) 102(2) to enable improvements to be made to installed applications on the computing device(s) 102(1), to keep such applications current, or to provide additional information or a substantially improved user experience to users of the computing device(s) 102(1).

The message(s) 106 may be received by a messaging client module 110 executing on the computing device(s) 102(1). In some cases, the messaging client module 110 may be always executing on the computing device(s) 102(1), or may be executing during a typical operational state of the computing device(s) 102(1). On receiving the message(s) 106, the messaging client module 110 may parse, analyze, or otherwise process the message(s) 106 to extract the update information 108 and identify one or more applications targeted by the message(s) 106 (e.g., application(s) to be updated). In some implementations, the message(s) 106 may include application identification information that identifies the application(s) for which the message(s) 106 carry updates. After determining an application corresponding to the message(s) 106, the messaging client module 110 or another module executing on the computing device(s) 102(1) may, at 112, determine an execution status of the application, the execution status indicating whether the application is currently active on the computing device 102(1). An application may be active if it is currently executing and if it is not paused or sleeping. In cases where the application is a user application that provides a user interface enabling user interaction, the application may be active if a user is currently interacting with the application, if the application is foregrounded on the computing device 102(1), or if the user interface of the application is currently being presented on the computing device 102(1). An application may be inactive in cases where the application is executing but is paused or sleeping. An application may also be determined as inactive if it is not currently executing on the computing device 102(1). The determination of whether the application is active may be based on the messaging client module 110 examining a list of processes, applications, or modules that are currently executing on the computing device 102(1).

If the execution status indicates that the application is currently active, the messaging client module 110 may communicate the update information 108 to an interpreter engine module 114(1) associated with the currently active application 116(1). In examples illustrated by FIG. 1, the application 116 is a native application that includes a web view component for handling interpreted language code such as JavaScript™, HTML, and so forth. In such cases, the interpreter engine module 114(1) may be the web view component incorporated into the application 116. If the application 116(1) is currently active, the interpreter engine module 114(1) (e.g., the web view component) may also be executing and available to handle the update information 108.

If the execution status indicates that the application is not currently active (e.g., is paused or not executing), the messaging client module 110 may communicate the update information 108 to a second interpreter engine module 114(2). In some cases, the second interpreter engine module 114(2) may already be executing to receive and process the update information 108. Alternatively, the messaging client module 110 may launch or start the interpreter engine module 114(2) to receive and process the update information 108. In some implementations, the interpreter engine module 114(2) may be a stand-alone interpreter engine that is configured to execute independently of the application 116. The interpreter engine module 114(2) may have a smaller set of features compared to those of the interpreter engine module 114(1), or may use a smaller portion of memory when executing. Accordingly, the interpreter engine module 114(2) may be described as a small footprint interpreter engine. In implementations where the update information 108 includes JavaScript™ code, one or both of the interpreter engine modules 114(1) and 114(2) may be JavaScript™ runtime engines or environments that are configured to execute JavaScript™ instructions.

The update information 108 applied to the currently active application 116(1) may generate an updated application 118 that is updated with regard to its feature(s), state, or both feature(s) and state. In cases where the update information 108 is applied to the currently inactive application 116(2) through use of the interpreter engine module 114(2), the interpreter engine module 114(2) may process the update information 108 and write the updates to memory on the computing device(s) 102(1). When the application 116(2) is subsequently activated, it may incorporate the updates from memory and activate as the updated application 118. In this way, implementations may enable updates to be applied to currently inactive application(s) 116(2) without launching a full version of the interpreter engine module 114(1) that may consume memory and processing capabilities, generate an intrusive UI, or otherwise impact performance or user experience on the computing device(s) 102(1).

Figure 2:
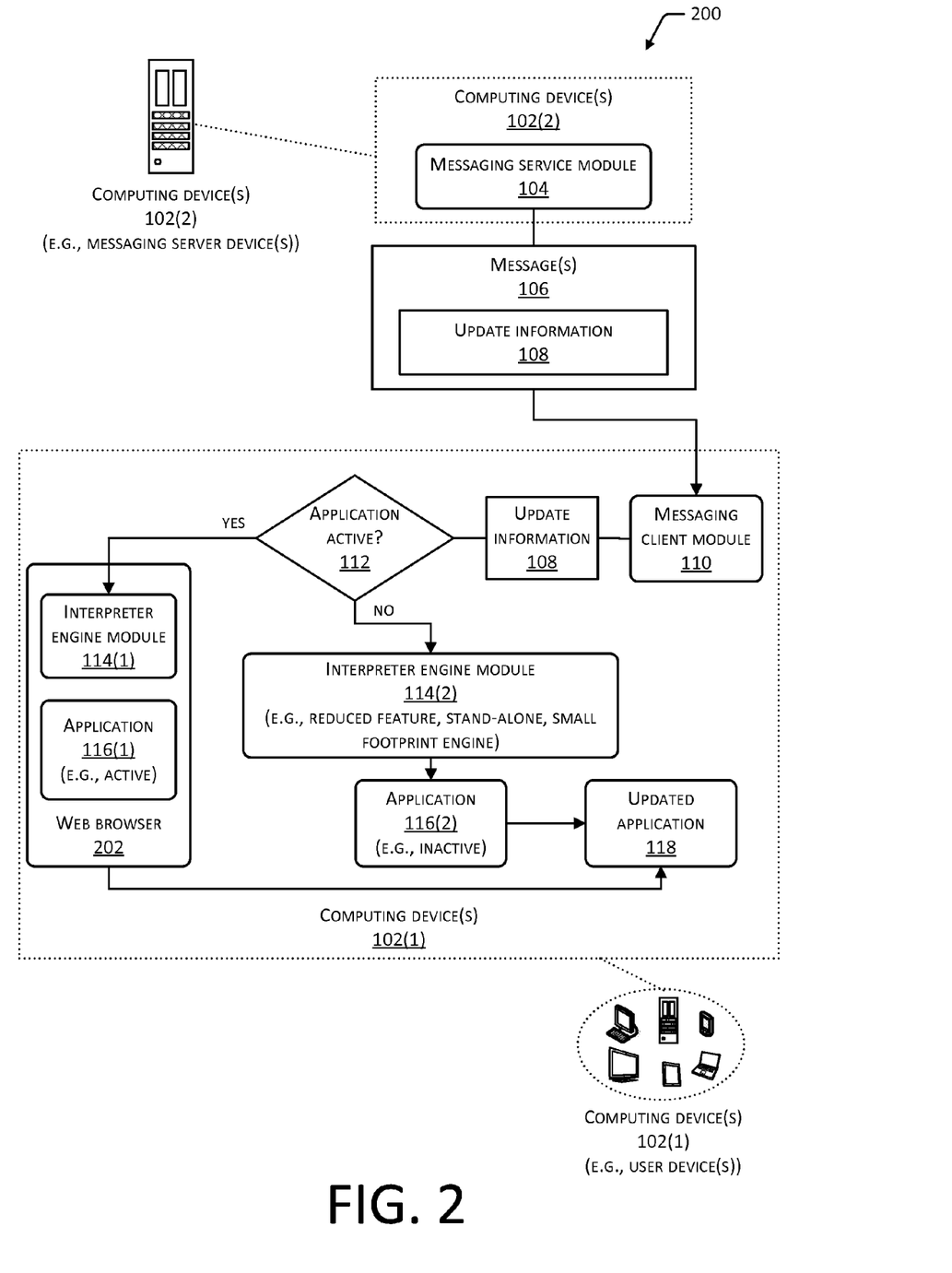
FIG. 2 depicts an environment for updating an application on a computing device that employs a stand-alone interpreter engine module for performing update operations, in cases where the updated application is a web application configured to execute within a web browser.

FIG. 2 depicts an environment 200 for updating the application(s) 116 on the computing device 102(1) that employs the stand-alone interpreter engine module 114(2) for performing update operations. The environment 200 includes various elements as described with reference to FIG. 1. In the examples illustrated by FIG. 2, the application 116 is a web application configured to execute within a web browser 202. Implementations support the use of any web browser 202, including but not limited to one or more of the following: Mozilla™ Firefox™; Microsoft™ Internet Explorer™; Google™ Chrome™; Apple™ Safari™; Rockmelt™; and so forth. The web browser 202 may include the interpreter engine module 114(1) to handle code, instructions, or other information that is described using an interpreted programming language.

If the execution status (e.g., as determined by the messaging client module 110) indicates that the application 116 is currently active and executing within the web browser 202 as the application 116(1), the messaging client module 110 may communicate the update information 108 to the interpreter engine module 114(1) included in the web browser 202. If the execution status indicates that the application is not currently active, the messaging client module 110 may communicate the update information 108 to the second, stand-alone interpreter engine module 114(2) as described with reference to FIG. 1. In this way, implementations may enable updates to be applied to currently inactive application(s) 116(2) without launching the web browser 202 and potentially impacting performance or user experience on the computing device 102(1).

Figure 3:
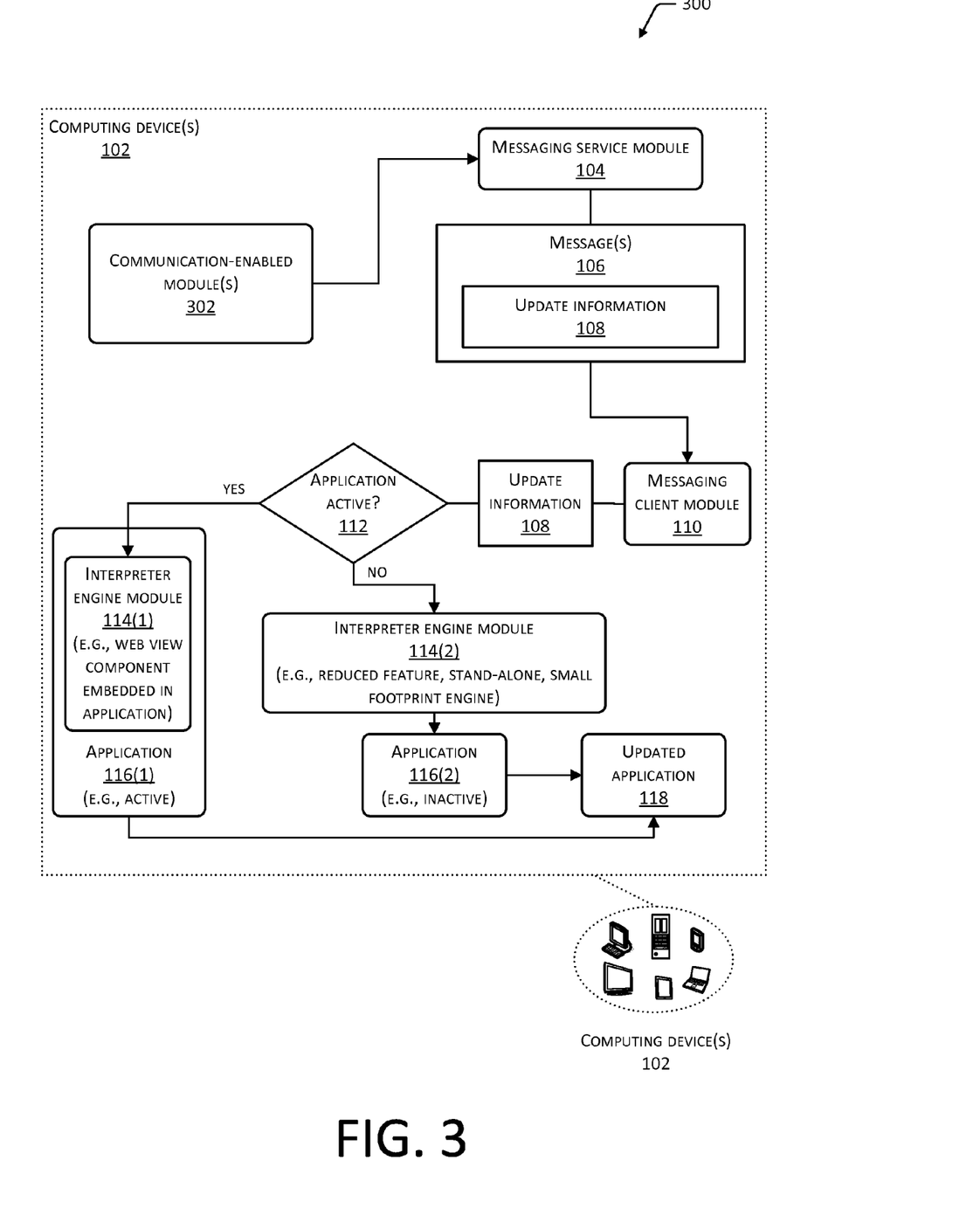
FIG. 3 depicts an environment for updating an application on a computing device that employs a stand-alone interpreter engine module for performing update operations, in cases where the update information is received from at least one other process executing locally on the computing device.

FIG. 3 depicts an environment 300 for updating application(s) 116 on a computing device 102. The environment 300 includes various elements as described with reference to FIG. 1. In the examples illustrated by FIG. 3, the update information 108 is received from at least one other communication-enabled module 302. The communication-enabled module(s) 302 may include any process, application, or module that is executing locally on the same computing device 102 with the application 116 to be updated. As shown in FIG. 3, the communication-enabled module(s) 302 may interact with the messaging service module 104 to generate the message(s) 106, which may then be provided to the messaging client module 110. The messaging client module 110 may then analyze the message(s) 106 to determine the targeted application(s) 116 to be updated, and to extract the update information 108. Alternatively, the communication-enabled module(s) 302 may communicate the updates to the application(s) 116 through the interpreter engine module(s) 114, without the intermediate processing of the messaging service module 104 or the messaging client module 110.

If the execution status (e.g., as determined by the messaging client module 110) indicates that the application 116 is currently active and executing as the application 116(1), such that the interpreter engine module 114(1) is also executing, the update information 108 may be sent to the interpreter engine module 114(1). If the execution status indicates that the application 116(2) is not currently active, the update information 108 may be communicated to the second, stand-alone interpreter engine module 114(2). Although FIG. 3 illustrates examples in which the application 116 is a native application that includes a web view component as the interpreter engine module 114(1), implementations also support the updating of a web application (e.g., as in the example of FIG. 2) from the communication-enabled module(s) 302 executing on the same computing device 102.

The various devices of the environments 100, 200, and 300 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environments 100, 200, and 300 may be encrypted or otherwise secured. For example, such communications may employ one or more public or private cryptographic keys, digital certificates, or other credentials supported by a security protocol such as any version of the Secure Socket Layer (SSL) or the Transport Layer Security (TLS) protocol.

Figure 4:
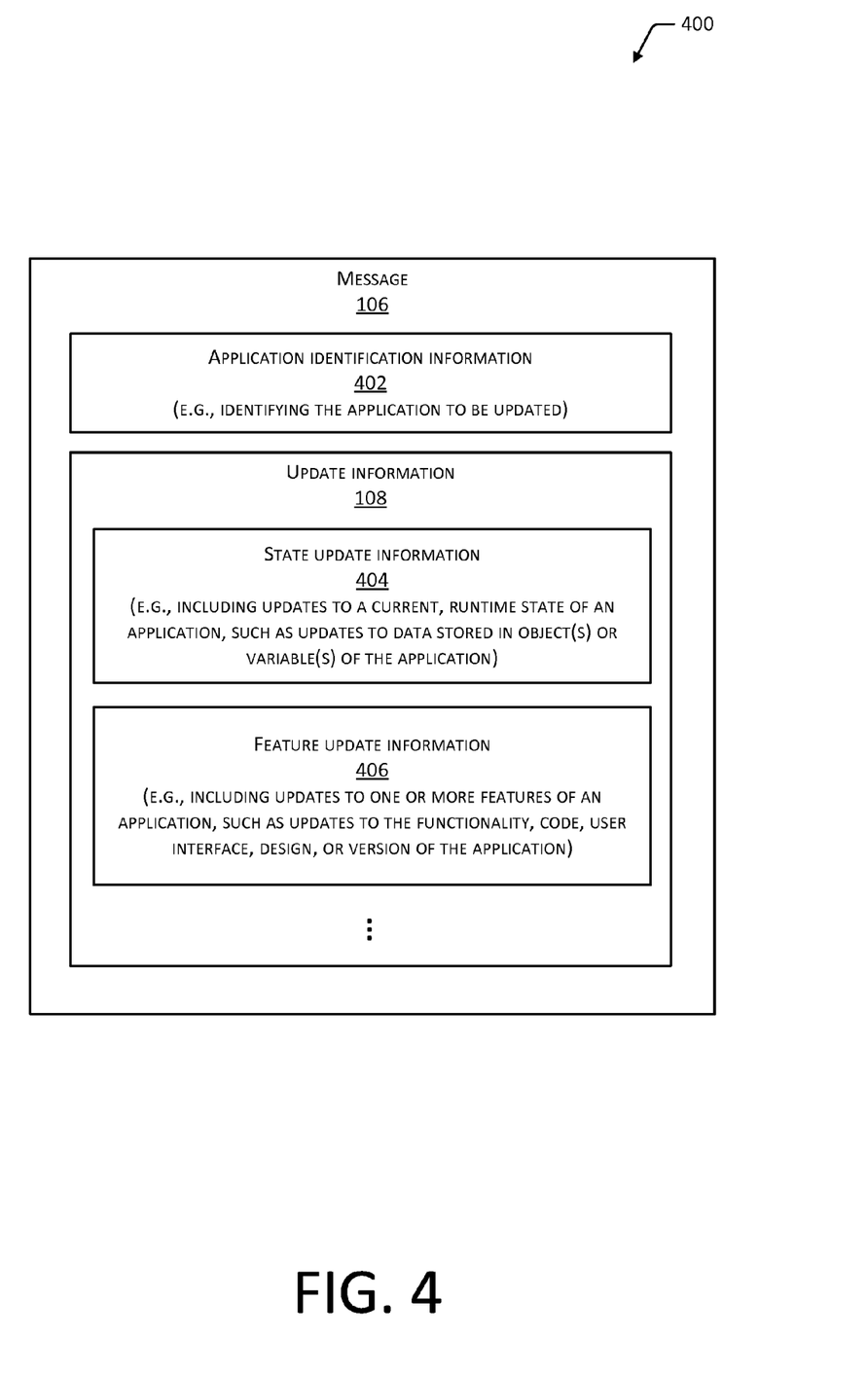
FIG. 4 depicts a schematic of an example message that includes update information to update one or more applications on a computing device.

FIG. 4 depicts a schematic 400 of an example message 106 that includes the update information 108 to update one or more applications 116 on the computing device(s) 102. As shown in the example of FIG. 4, the message(s) 106 may include application identification information 402 that identifies or otherwise describes the application(s) 116 to be updated based on the update information 108. In some implementations, the application identification information 402 may include process names or application names of the application(s) 116, installation paths or locations of the application(s) 116 on the computing device 102, registration identifiers for the application(s) 116, or other information that may identify the application(s) 116 to be updated.

The message(s) 106 may also include the update information 108. As described above, the update information 108 may be included as code or instructions in an interpreted programming language such as JavaScript™, HTML, Java™, Peri™, VBScript™ and so forth. The update information 108 may include state update information 404 to be employed to update a current state of the application(s) 116. The state may include a current runtime or execution state of the application(s) 116, such as the data currently stored in objects, variables, or other active memory structures associated with the application(s) 116. The state of the application(s) 116 may be described as the data currently stored in such memory structures within the interpreter engine module 114 (e.g., the interpreter, runtime, or virtual machine) that was last executing the application(s) 116, in cases where the application(s) 116 execute in the interpreter engine module 114.

The update information 108 may include feature update information 406 to be employed to update one or more features of the application(s) 116. The feature(s) of the application(s) 116 may be described as the functions, operations, design, user interface, or other aspects of the application(s) 116. The feature(s) of the application(s) 116 may include any aspects that persist across various executions of the application(s) 116, and that therefore may be distinguished from a current or recent runtime state of the application(s) 116. The feature update information 406 may include updates to the source code, the compiled binary code, the compiled intermediate language code (e.g., where the application 116 is a Java™ application, C#™ application, or an application written in another interpreted language), or the feature set of the application(s) 116. Accordingly, the feature update information 406 may specify an updated version of the application(s) 116.

The update information 108 may include the state update information 404, the feature update information 406, or both the state update information 404 and the feature update information 406. Implementations also support other types of information included in the message(s) 106.

Figure 5:
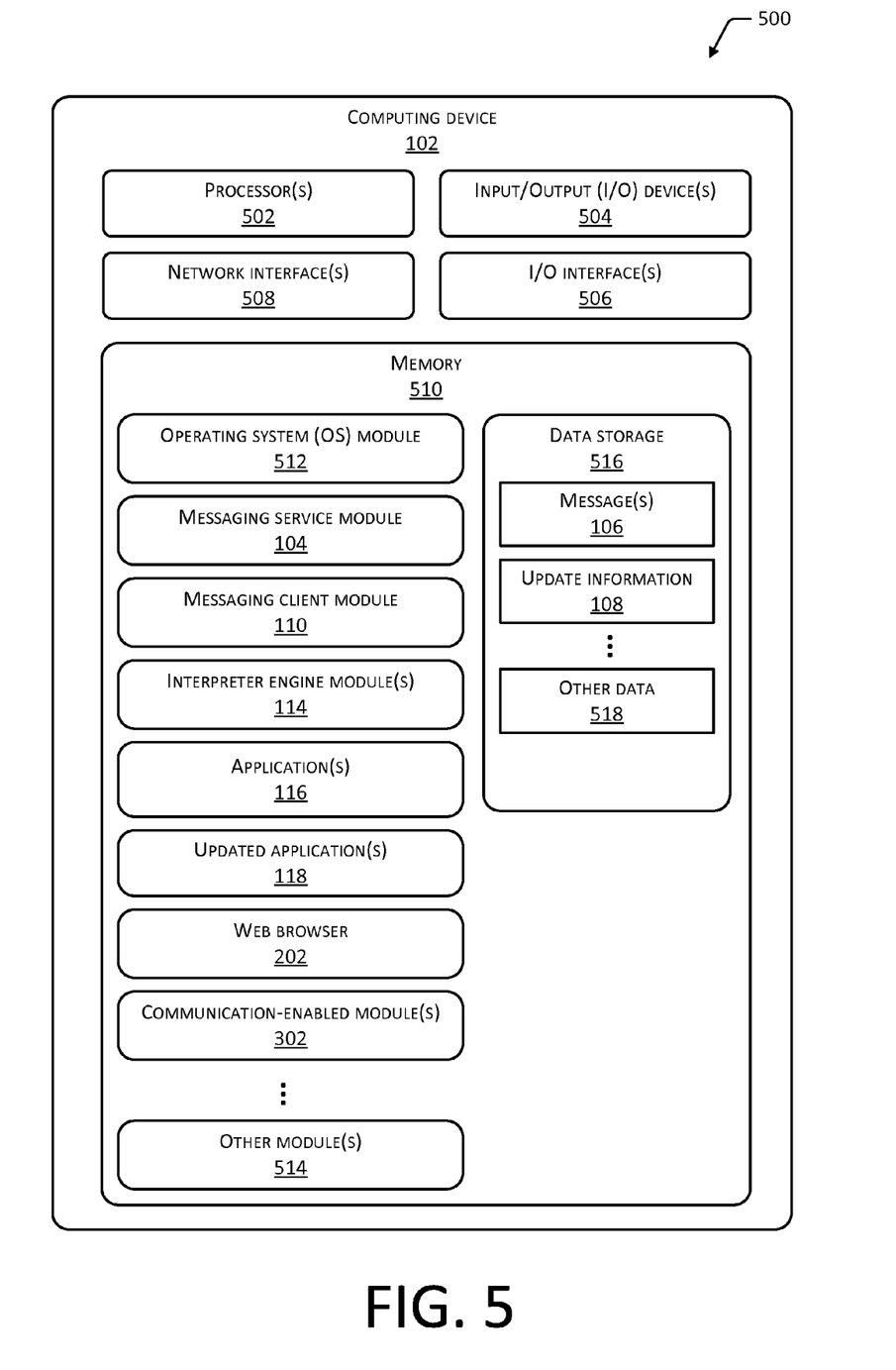
FIG. 5 depicts a block diagram of an example computing device that may be employed to update applications, the computing device including a stand-alone interpreter engine module for performing update operations.

FIG. 5 depicts a block diagram 500 of an example of the computing device(s) 102 that may be employed to update the application(s) 116, the computing device(s) 102 including the stand-alone interpreter engine module 114(2) for performing update operations. As shown in the block diagram 500, the computing device 102 may include one or more processors 502 configured to execute one or more stored instructions. The processor(s) 502 may comprise one or more cores.

The computing device 102 may include one or more input/output (I/O) devices 504. The I/O device(s) 504 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 504 may also include output devices such as a display, an audio output device (e.g., a speaker), a printer, a haptic output device, and so forth. The I/O device(s) 504 may be physically incorporated with the computing device 102, or may be externally placed.

The computing device 102 may include one or more I/O interfaces 506 to enable components or modules of the computing device 102 to control, interface with, or otherwise communicate with the I/O device(s) 504. The I/O interface(s) 506 may enable information to be transferred in or out of the computing device 102, or between components of the computing device 102, through serial communication, parallel communication, or other types of communication. For example, the I/O interface(s) 506 may comply with a version of the RS-232 standard for serial ports, or with a version of the IEEE 1284 standard for parallel ports. As another example, the I/O interface(s) 506 may be configured to provide a connection over Universal Serial Bus (USB) or Ethernet. In some cases, the I/O interface(s) 506 may be configured to provide a serial connection that is compliant with a version of the IEEE 1394 standard. The computing device 102 may also include one or more busses or other internal communications hardware or software that allow for the transfer of data between the various modules and components of the computing device 102.

The computing device 102 may include one or more network interfaces 508 that enable communications between the computing device 102 and other network accessible computing devices. The network interface(s) 508 may include one or more network interface controllers (NICs) or other types of transceiver devices configured to send and receive communications over a network.

The computing device 102 may include one or more memories, described herein as memory 510. The memory 510 comprises one or more computer-readable storage media (CRSM). The CRSM may include one or more of an electronic storage medium, a magnetic storage medium, an optical storage medium, a quantum storage medium, a mechanical computer storage medium, and so forth. The memory 510 provides storage of computer-readable instructions that may describe data structures, program modules, processes, applications, or other data for the operation of the computing device 102. In some implementations, the memory 510 may provide storage of computer-readable instructions or other information in a non-transitory format.

The memory 510 may include an operating system (OS) module 512. The OS module 512 may be configured to manage hardware resources such as the I/O device(s) 504, the I/O interface(s) 506, and the network interface(s) 508, and to provide various services to applications, processes, or modules executing on the processor(s) 502. The OS module 512 may include one or more of the following: any version of the Linux™ operating system originally released by Linus Torvalds; any version of iOS™ from Apple™ Corp. of Cupertino, Calif., USA; any version of Windows™ or Windows Mobile™ from Microsoft™ Corp. of Redmond, Wash., USA; any version of Android™ from Google™ Corp. of Mountain View, Calif., USA and its derivatives from various sources; any version of Palm OS™ from Palm Computing™, Inc. of Sunnyvale, Calif., USA and its derivatives from various sources; any version of BlackBerry OS™ from Research In Motion™ Ltd. of Waterloo, Ontario, Canada; any version of VxWorks™ from Wind River Systems™ of Alameda, Calif., USA; or other operating systems.

The memory 510 may include one or more of the modules described above as executing on the computing device(s) 102, such as the messaging service module 104, the messaging client module 110, the application(s) 116, the interpreter engine modules 114(1) and 114(2), the web browser 202, and the communication-enabled module(s) 302. The memory 510 may also include one or more other modules 514, such as a user authentication module or an access control module to secure access to the computing device 102, and so forth.

The memory 510 may include data storage 516 to store data for operations of the computing device 102. The data storage 516 may comprise a database, array, structured list, tree, or other data structure, and may be a relational or a non-relational datastore. The data storage 516 may store data such as that described above, including one or both of the message(s) 106 or the update information 108. The data storage 516 may also store other data 518, such as user authentication information or access control data. In some implementations, at least a portion of the information stored in the data storage 516 may be stored externally to the computing device 102, on other devices that may communicate with the computing device 102 via the I/O interface(s) 506 or via the network interface(s) 508.

Figure 6:
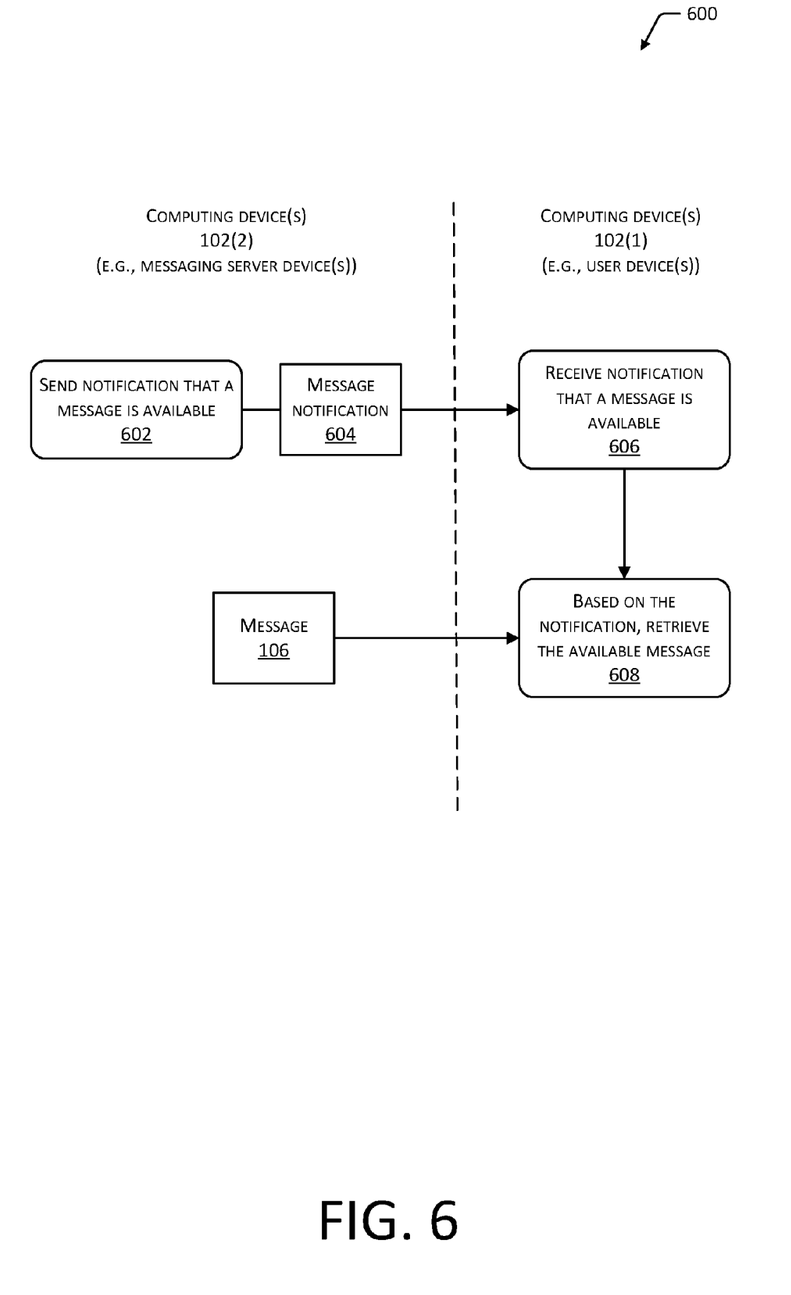
FIG. 6 depicts a flow diagram of a process for receiving a message that may include update information to update one or more applications.

FIG. 6 depicts a flow diagram 600 of a process for receiving the message(s) 106 that include the update information 108 to update the one or more applications 116. One or more operations of the process may be performed by the messaging service module 104, the messaging client module 110, or other modules of the computing device(s) 102.

At 602, a message notification 604 may be sent from the computing device(s) 102(2) (e.g., the messaging server device(s)) to the computing device(s) 102(1) (e.g., the user device(s)), indicating that a message 106 is available. In some cases, the message notification 604 may be sent to one or more particular computing devices 102(1) or to one or more particular types of computing devices 102(1). Alternatively, the message notification 604 may be broadcast to a plurality of computing devices 102(1) of various types or configurations.

At 606, the message notification 604 may be received by the messaging client module 110 or other modules 514 executing on the computing device(s) 102(1). At 608, based at least partly on the message notification 604, the available message 106 may be retrieved from the computing device(s) 102(2) or from another device in communication with the computing device(s) 102(1). In some implementations, the retrieval of the available message 608 may employ a GET or some other request to retrieve the message 106 from a particular location identified by a Uniform Resource Locator (URL) or some other designated network location. Such requests may be Hypertext Transfer Protocol (HTTP) requests, or may be based on some other communication protocol.

FIG. 6 illustrates an example of a process in which the message notification 604 is first pushed to the computing device(s) 102(1), and the message 106 is then pulled from the computing device(s) 102(2) to the computing device(s) 102(1). Other implementations may support a push messaging service in which the message 106 is sent from the computing device(s) 102(2) to the computing device(s) 102(1) without the preliminary message notification 604. Alternatively, some implementations may support a pull messaging service in which the message 106 is retrieved from the computing device(s) 102(2) by the computing device(s) 102(1) without the preliminary message notification 604. Further, as illustrated above in FIG. 3, the message 106 may be communicated internally between modules executing on a same computing device 102.

Figure 7:
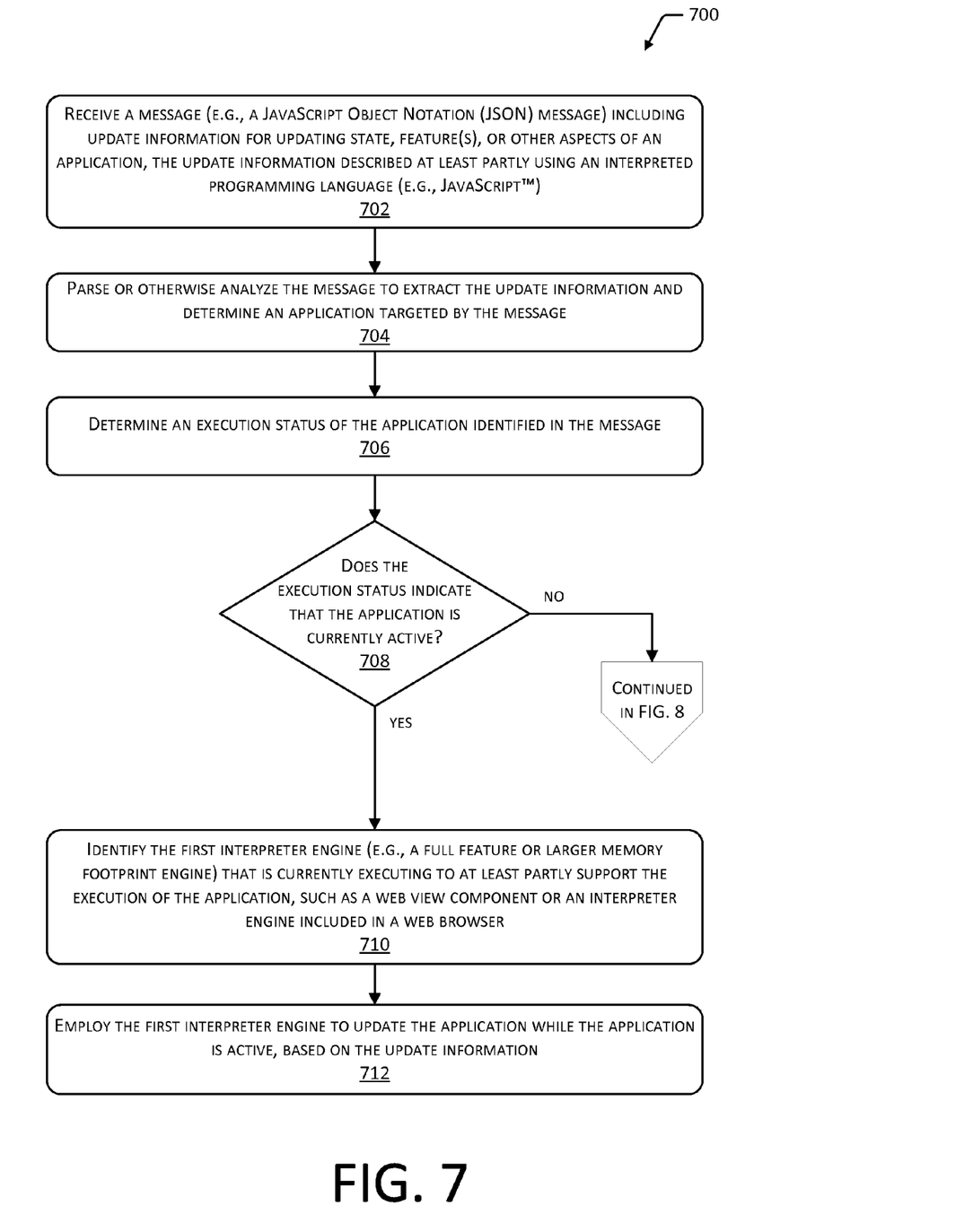
FIG. 7 depicts a flow diagram of a process for updating an application on a computing device, employing a first interpreter engine module that may be incorporated into the application being updated.

FIG. 7 depicts a flow diagram 700 of a process for updating the application(s) 116 on the computing device 102, employing the first interpreter engine module 114(1). One or more operations of the process may be performed by the messaging client module 110 or other modules of the computing device(s) 102. As described above, the first interpreter engine module 114(1) may be incorporated into the application 116 as a web view component. Alternatively, the first interpreter engine module 114(1) may be included as a component of the web browser 202 in which the application 116 is executing as a web application. In some cases, the first interpreter engine module 114(1) may be a stand-alone interpreter engine with a fuller feature set or a larger memory footprint than the second (e.g., stand-alone) interpreter engine module 114(2).

At 702, the message 106 may be received by the messaging client module 110 or another process executing on the user device 102. The message 106 may include the update information 108 as described with reference to FIG. 4. In some implementations, the message 106 may be arranged according to a format, schema, or protocol, such that the update information 108 is included in the message 106 as instructions or code in an interpreted programming language. For example, the message 106 may be in the JSON format, and the update information 108 may be incorporated as JavaScript™ code.

At 704, the message 106 may be parsed, analyzed, or otherwise processed to extract the update information 108 and to determine the application 116 that is to be updated with the update information 108 included in the message 106.

At 706, a determination is made of an execution status of the application 116 identified in the message 106. As described above, the execution status may be determined based at least partly on examining a list of currently active processes or applications on the computing device 102.

At 708, a determination is made whether the execution status indicates that the application 116 is active, such that it is currently executing or currently presented (e.g., foregrounded) on the computing device 102. If the application 116 is not currently active, the process may proceed to 802 described with reference to FIG. 8. If the application 116 is currently active, the process may proceed to 710.

At 710, the first interpreter engine module 114(1) is identified that is currently executing to at least partly support the execution of the application 116. As described above with reference to FIG. 1, the first interpreter engine module 114(1) may be a web view component that is incorporated into the application 116 (e.g., a native application). Alternatively, the first interpreter engine module 114(1) may be a component of the web browser 202 in which the application 116 (e.g., a web application) is currently executing. The first interpreter engine module 114(1) may include a larger set of features than the second interpreter engine module 114(2), or may consume a larger portion of memory than the second interpreter engine module 114(2) while executing.

At 712, the first interpreter engine module 114(1) may be employed to update the application 116 based on the update information 108, while the application 116 is active. In cases where the update information 108 includes the feature update information 406, updating may include restarting the application 116 to incorporate new features or new functionality into the application 116, or to apply changes to the source code or binary executable of the application 116. In cases where the update information 108 includes the state update information 404, updating may include updating the data stored in variables, objects, or other data structures of the application 116 in active memory while the application 116 is executing.

Figure 8:
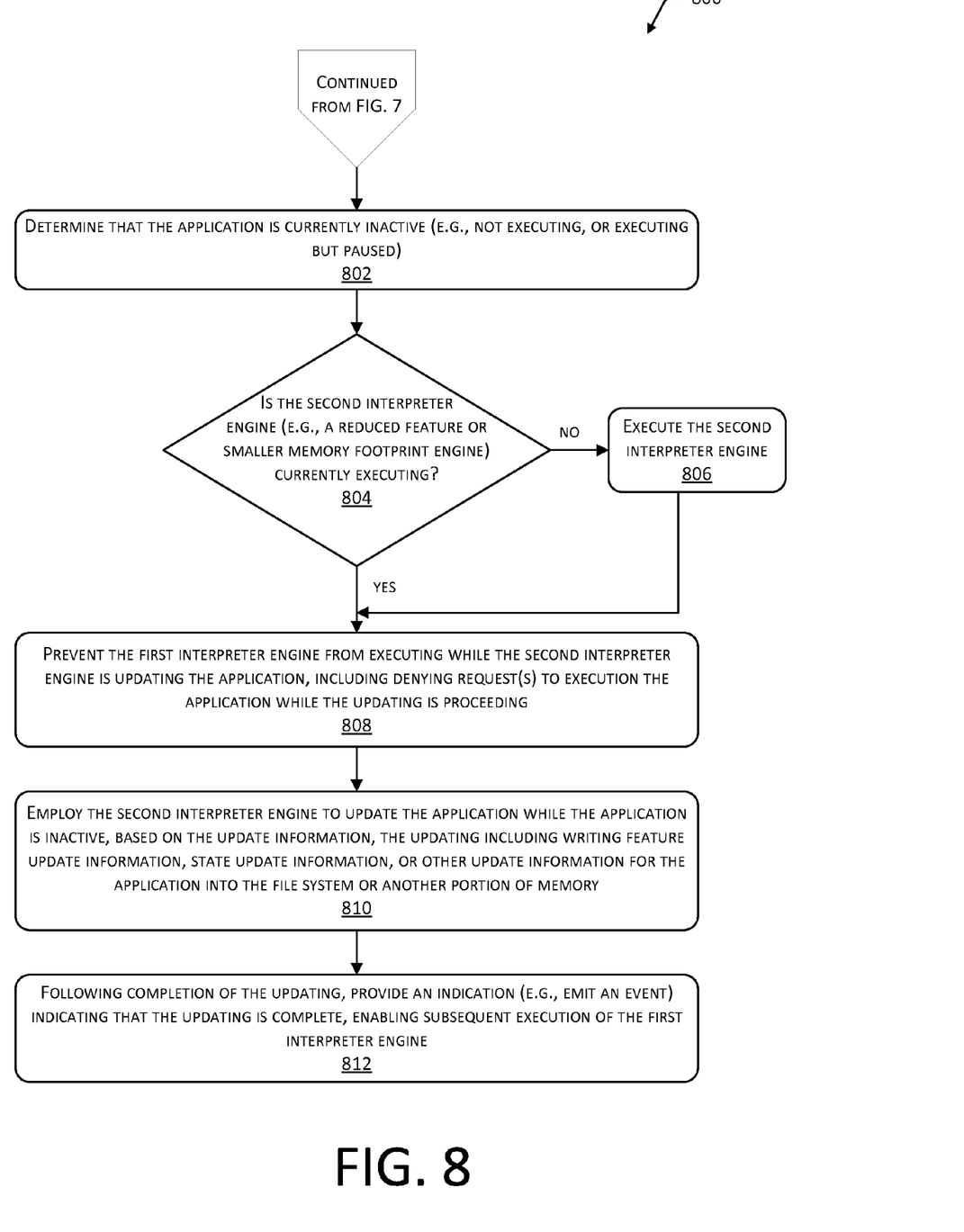
FIG. 8 depicts a flow diagram of a process for updating an application on a computing device, employing a second interpreter engine module (e.g., a stand-alone interpreter engine).

FIG. 8 depicts a flow diagram 800 of a process for updating the application(s) 116 on the computing device 102, employing the second interpreter engine module 114(2) (e.g., a stand-alone, smaller memory footprint interpreter engine). One or more operations of the process may be performed by the messaging client module 110 or other modules of the computing device(s) 102.

At 802, a determination is made that the application 116 (e.g., the application 116 identified in the message 106) is currently inactive, based on the analysis of the execution status at 708. As described above, the inactive execution status may indicate that the application 116 is not currently executing on the computing device 102, or that the application 116 is currently executing but paused, sleeping, or in the background.

At 804, a determination is made whether the second interpreter engine module 114(2) is currently executing on the computing device 102. As described above, the second interpreter engine module 114(2) may have a reduced set of features compared to those of the first interpreter engine module 114(1), or may use a smaller portion of memory than the first interpreter engine module 114(1) while executing. If it is determined that the second interpreter engine module 114(2) is executing, the process may proceed to 808. If it is determined that the second interpreter engine module 114(2) is not currently executing, the process may proceed to 806 and launch, start, or otherwise initiate execution of the second interpreter engine module 114(2). The process may then proceed to 808.

In some implementations, at 808 the first interpreter engine module 114(1) may be blocked or otherwise prevented from executing while the second interpreter engine module 114(2) is updating the application 116. Such blocking may prevent possible conflicts between different versions of the state or the feature(s) of the application 116, such as attempting to update the runtime state data or the feature(s) of the application 116 while that state data or feature(s) are being accessed, modified, or otherwise employed by the executing application 116. In some cases, blocking the first interpreter engine module 114(1) from executing may include the denying (e.g., by the operating system) of one or more requests to launch the application 116 while the updating is in progress.

At 810, the second interpreter engine module 114(2) may be employed to update the application 116 while the application 116 is inactive, based at least partly on the update information 108. In some implementations, the updating at 810 may include writing the update information 108 to storage on the computing device 102. In some cases, the updating may include writing the update information 108 to a portion of the storage allocated to the file system. In cases where the application 116 is executing but paused, the updating at 810 may include writing the state update information 404 to the active memory that holds data stored in objects, variables, or other runtime memory structures of the application 116.

At 812, following the completion of the updating, an indication may be provided indicating that the updating is complete. Providing the indication may include emitting an event from the second interpreter engine module 114(2) or another module. The indication may indicate, to the first interpreter engine module 114(1), that the updating is complete and that the first interpreter engine module 114(1) may execute. Thus, the indication provided at 812 may discontinue the blocking initiated at 808.

Figure 9:
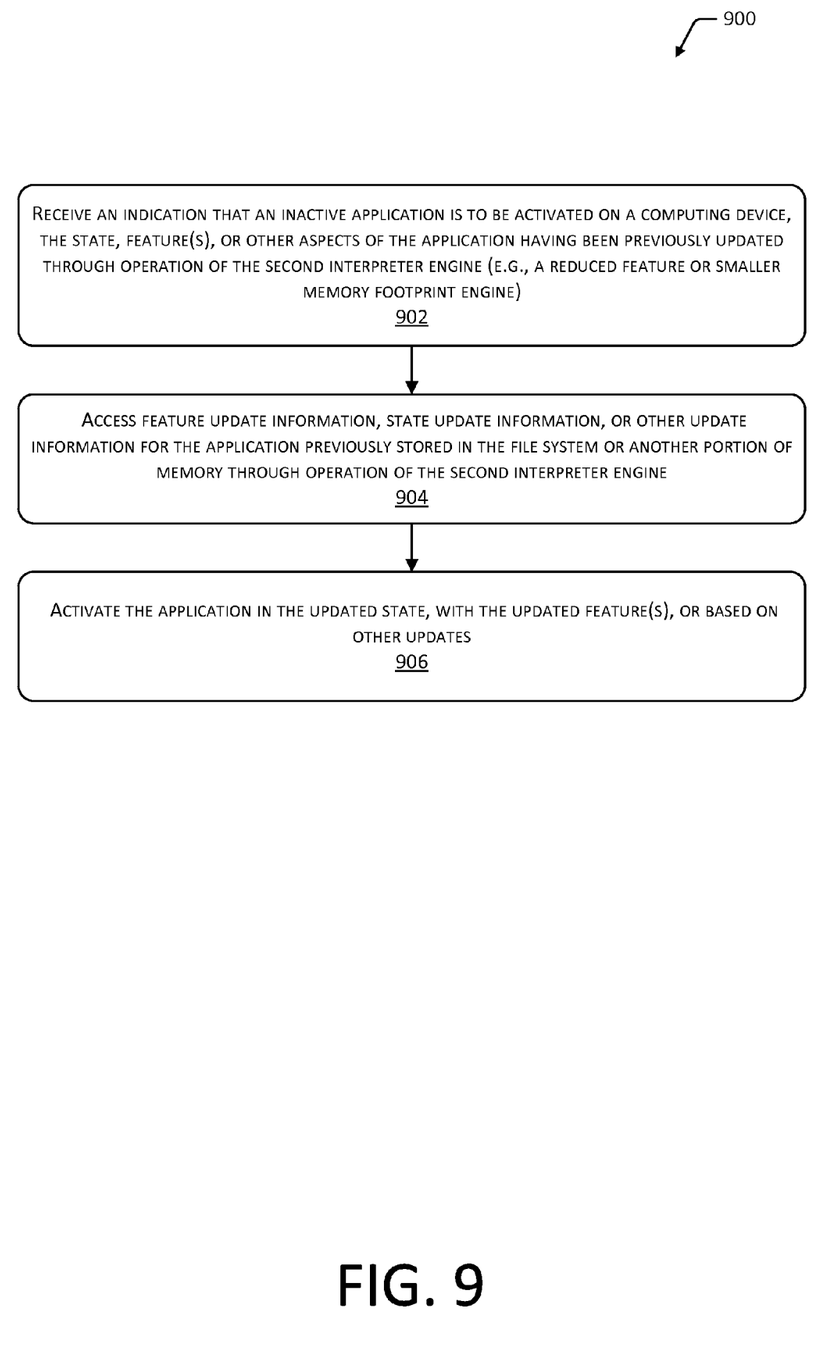
FIG. 9 depicts a flow diagram of a process for launching an application which has been updated while inactive.

FIG. 9 depicts a flow diagram 900 of a process for launching the application 116 which has been updated while inactive, as described above with reference to FIG. 8. One or more operations of the process may be performed by the OS module 512 or other modules 514 of the computing device(s) 102.

At 902, an indication may be received that an inactive application 116 is to be activated on the computing device 102. Such an indication may be received by the OS module 512 based on a user or another process of the computing device 102 launching the application 116. In cases where the inactive application 116 is executing but paused or in the background, the indication of activation may be based on a user or other process instructing that the application 116 is to be foregrounded or unpaused. The inactive application 116 may have been updated previously, as described above with reference to FIG. 8.

At 904, the updates may be accessed from locations where they were stored in active memory 510 or in storage on the computing device 102 during the updating as described above. In cases where updating included using the state update information 404 to modify data stored in variables, objects, or other runtime data structures in the active memory associated with the application 116, the updates may be accessed from the active memory 510. In cases where updating included storing the feature update information 406 in storage to indicate that features, functions, or code of the application 116 is to be updated, the updates may be accessed from the storage.

At 906, the application 116 may be activated in its updated state, using its updated feature(s), or both in its updated state and using its updated feature(s). Implementations also support other types of updates made to the application 116.

In some implementations, the updating functionality described above may be provided as an Application Programming Interface (API) to developers of the application(s) 116. Such an API may enable the developers to specify what update information 108 may be employed to update the application(s) 116, and when such updates may be performed based on received message(s) 106.

Although the above examples describe selecting one of two interpreter engine modules 114 to perform updates to application(s) 116 based on the execution status of the application(s) 116, implementations are not so limited. In some implementations, the computing device 102 may include any number of interpreter engine modules 114 of varying functionality and size. In such cases, one of a plurality of interpreter engine modules 114 may be selected to perform updates, and the selecting may be based on one or more criteria. For example, different interpreter engine modules 114 may be employed to update the state or features of the application(s) 116, and the particular interpreter engine module 116 to employ may be selected based on whether the updating information 108 includes the state update information 404 or the feature update information 406. In some cases, different interpreter engine modules 114 may be configured to update different aspects of the state or feature(s) of the application(s) 116, such as UI features, data storage access features, network features, and so forth. In such cases, the particular interpreter engine module 114 to employ may be selected based on an analysis of the update information 108 to determine which aspects of the application(s) 116 are to be updated. In some implementations, a developer of the application(s) 116, a user of the computing device 102, or a provider of the update information 108 may specify which interpreter engine module 114 is to be employed to perform updates. Such a specification may be included in the update information 108 or may be stored on the computing device 102 (e.g., as a registry setting).

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
   receiving, at a computing device, a message identifying an application that is executable on the computing device, the message including update information to update at least one of a runtime state or a feature of the application, the update information described using an interpreted programming language, the application including a web view component that is embedded in the application to interpret the interpreted programming language;
   determining an execution status of the application on the computing device;
   if the execution status indicates that the application is active, such that the web view component of the application is executing, employing the web view component to update the application based on the update information; and
   if the execution status indicates that the application is inactive, such that the application is asleep or not executing, employing an interpreter engine to update the application based on the update information, the interpreter engine being executable separately from the application and operative to interpret the interpreted programming language, the interpreter engine being executable within a smaller portion of memory on the computing device than the web view component, the interpreter engine consuming less processing capacity of the computing device than the web view component, and the interpreter engine including a smaller feature set than the web view component, the employing of the interpreter engine being to mitigate performance degradation incurred on the computing device by employing the web view component to update the application.

2. The method of claim 1, the web view component being at least one of a WebView class or a UIWebView class compiled into the application.

3. The method of claim 1, further comprising:
determining that the interpreter engine is not currently executing on the computing device; and
executing the interpreter engine to update the application.

4. The method of claim 1, further comprising:
receiving a request to execute the application;
determining that the interpreter engine is being employed to update the application;
denying the request to execute the application, to prevent the application and the web view component from executing while the interpreter engine is updating the application; and
providing to the application an indication that the updating is complete, the indication enabling subsequent execution of the application.

5. A system, comprising:
at least one memory storing computer-executable instructions, including:
an application;
a first interpreter engine that is executable with the application and that is operative to interpret an interpreted programming language; and
a second interpreter engine that is executable separately from the application and that is operative to interpret the interpreted programming language, the second interpreter engine being executable within a smaller portion of the at least one memory than the first interpreter engine; and
at least one processor in communication with the at least one memory, the at least one processor configured to access the at least one memory and execute the computer-executable instructions to:
receive a message that identifies the application, the message including update information to update at least one of a state or a feature of the application, the update information described at least partly using the interpreted programming language;
determine an execution status of the application indicates that the application is inactive, such that the application is asleep or not executing;
employ the second interpreter engine to update the application based on the update information;
receive a request to execute the application;
determine that the second interpreter engine is being employed to update the application; and
deny the request to execute the application.

6. The system of claim 5, the at least one processor further configured to:
determine that the application is active; and
employ the first interpreter engine to update the application based on the update information included in the message.

7. The system of claim 5, wherein the first interpreter engine is a web view component embedded in the application.

8. The system of claim 5, wherein:
the at least one memory further stores a browser module;
the first interpreter engine is a component of the browser module; and
the application is a web application configured to execute within the browser module.

9. The system of claim 5, wherein the message is described at least partly using JavaScript Object Notation (JSON).

10. The system of claim 5 the at least one processor further configured to:
after completion of the updating of the application using the second interpreter engine, provide to the first interpreter engine an indication of the completion of the updating, the indication enabling subsequent execution of the first interpreter engine.

11. The system of claim 5, wherein:
the state of the application includes data stored in at least one of an object or a variable associated with the application.

12. The system of claim 5, wherein:
the feature of the application includes at least one of a function of the application, a user interface element of the application, a design feature of the application, code of the application, or a version of the application.

13. The system of claim 5, wherein the interpreted programming language is a scripting language.

14. One or more non-transitory computer-readable media storing instructions which, when executed by at least one processor, instruct the at least one processor to perform actions comprising:
receiving, at a computing device, a message identifying an application that is executable on the computing device, the message including update information to update the application, the update information described at least partly using an interpreted programming language, the computing device including:
a first interpreter engine that is executable with the application and that is operative to interpret the interpreted programming language; and
a second interpreter engine that is executable separately from the application and that is operative to interpret the interpreted programming language, the second interpreter engine having fewer features than the first interpreter engine;
determining an execution status of the application on the computing device, the execution status indicating that the application is inactive;
employing the second interpreter engine to update the application based on the update information;
receiving a request to execute the application;
determining that the second interpreter engine is being employed to update the application; and
denying the request to execute the application.

15. The one or more non-transitory computer-readable media of claim 14, the execution status indicating that the application is inactive including one or more of:
the execution status indicating that the application is executing and asleep; or
the execution status indicating that the application is not executing.

16. The one or more non-transitory computer-readable media of claim 14, wherein:
the update information is configured to update a state of the application; and
the state of the application includes data stored in at least one of an object or a variable associated with the application.

17. The one or more non-transitory computer-readable media of claim 14, wherein the first interpreter engine is a web view component compiled into the application.

18. The one or more non-transitory computer-readable media of claim 17, wherein:
   the first interpreter engine is a component of a browser module that is executable on the computing device; and
   the application is a web application configured to execute within the browser module.

* * * * *